United States Patent [19]

Falp et al.

[11] Patent Number: 5,068,522

[45] Date of Patent: Nov. 26, 1991

[54] ARRANGEMENT FOR DETERMINING THE DIRECTION OF THE ENERGY CENTER OF A LUMINOUS OBJECT

[75] Inventors: Benoit Falp, Versailles; Christian Pezant, Villecresnes, both of France

[73] Assignee: U.S. Philips Corp., New York, N.Y.

[21] Appl. No.: 485,208

[22] Filed: Feb. 26, 1990

[30] Foreign Application Priority Data

Feb. 24, 1989 [FR] France ................................ 89 02400

[51] Int. Cl.$^5$ ............................................. H01J 40/14
[52] U.S. Cl. ................................ 250/206.1; 250/203.3; 356/141
[58] Field of Search ............... 250/203.1, 203.3, 203.4, 250/203.6, 206.1, 206.2, 208.1; 358/213.27, 213.29; 356/141, 152

[56] References Cited

U.S. PATENT DOCUMENTS

| | | | |
|---|---|---|---|
| 3,640,628 | 2/1972 | Jones | 250/203.3 |
| 4,710,028 | 12/1987 | Grenier et al. | 356/141 |
| 4,713,533 | 12/1987 | Bremer et al. | 250/203.1 |

Primary Examiner—David C. Nelms

[57] ABSTRACT

An arrangement (100) for determining the position of the energy center (o') of the image (S') of a luminous object by barycentric calculation within a window (122) surrounding said image (S') and covering $p_l \times p_c$ elements of a charge-transfer matrix (120). According to the invention, the arrangement has:

a first mode of operation, during which on the one hand said matrix (120) is read by grouping the $N_l$ lines m-by-m ($m < p_l$) in the output register (121), whereas on the other hand, the output register (121) is emptied by grouping, in the read arrangement (123) of the matrix (120), l ($l < p_c$) consecutive elements from the output register (121), so as to determine the brightest zone $m \times l$ (124) of the matrix defining the approximate position of the image (S') on the matrix, a second mode of operation, during which the matrix (120) is first read, by grouping the lines n-by-n ($n > p_l$), thereafter, line by line in a zone (125) of k lines ($k > p_l$) located around said brightest zone (124), and finally, by again grouping the lines n-by-n until all the $N_l$ lines have been used up.

Use: solar view finders.

2 Claims, 1 Drawing Sheet

ARRANGEMENT FOR DETERMINING THE DIRECTION OF THE ENERGY CENTER OF A LUMINOUS OBJECT

BACKGROUND OF THE INVENTION

1. Fields of the Invention

The present invention relates to an arrangement for determining the direction of the energy center of a luminous object, comprising a lens forming an image of said luminous object on a photo-sensitive detector.

2. Art Background

A particularly advantageous use of the invention is in the field of observing luminous objects, such as the sun for example, more specifically for positioning ground-based radar or for supervising the behavior of missiles in their orbit.

Among the arrangements for determining the direction of the energy center of a luminous object defined in the opening paragraph, solar view finders, using a unidimensional charge-transfer strip as a photo-sensitive detector, are known. This type of field finder, however, has the disadvantage of supplying only a single piece of information, regarding the direction of the luminous object aimed at, that is to say the position of the gravity center of the spot image on the axis of the strip.

In order to obtain the two information components, needed for a complete determination of the direction of the energy center of the luminous object, recourse may be had to a photo-sensitive detector, constituted by a charge-transfer matrix. These arrangements, for example of the type marketed by the firm of Thomson-CSF under the type designation TH 7863, look like a mosaic of image elements divided into two parts: a first half, the photo-sensitive zone, is intended to receive and detect the light radiation coming from the object aimed at, and the second half, covered with an opaque film, serves as a memory in which the information components received by the first half of the matrix are stored by means of charge transfer. This reduction of the surface of the photo-sensitive detector by a factor 2 has for its consequence that the field of vision is limited, which is particularly disadvantageous when one wants to realize an arrangement by means of which the direction of a luminous object can be obtained in an autonomous manner, i.e. without the assistance of auxiliary equipment, which would first move the view finder roughly in the direction of the object searched. To that end, it is advisable to have available the widest field of view offered by the total surface area of the charge transfer matrix, while using an identical detector, but whose memory zone, which is not covered by an opaque film, may then also be used as the photo-sensitive zone. However, the use of such a matrix without a memory is not to be expected because of the inevitable appearance of a vertical luminous streak which is superimposed on the useful image and which more specifically reduces the contrast as a consequence thereof.

In fact, at the end of a period known as the integration period, which is determined such that the spot image reaches a sufficient energy level, the matrix is read by transferring the successive lines to an output register integrated into said matrix. A new image of the luminous object is formed on the photo-sensitive zone during each read cycle of the output register, as the transfer of lines and their reading into the output register are not instantaneous and in that the matrix is permanently exposed to light. The total number of these images obtained between two integrations constitute said annoying luminous streak, whose equivalent integration period is equal to the read time of the spot image. In general, the read time of the spot image cannot be neglected relative to the integration period, especially the luminous object aimed at being very bright, for example the sun, when the integration time is comparatively short. It follows that the luminous streak is sufficiently large to limit the contrast in an unacceptable manner.

SUMMARY OF THE INVENTION

The object of the present invention is to realize an arrangement for determining the direction of the energy center of a luminous object, the arrangement comprising a lens forming an image of said luminous object on a photo-sensitive detector, with the aid of which arrangement, using a charge-transfer matrix without memory as the photo-sensitive detector, it would be possible to eliminate said luminous streak to a large extent in such a manner as to improve the precision with which the position of the image on the matrix is measured.

According to the invention, a solution of the technical problem posed is characterized in that, said photo-sensitive detector being a charge-transfer matrix without memory, having $N_1$ lines and $N_c$ columns with an output register of $N_c$ elements, and the position of the energy center of the image of the luminous object being determined by barycentric calculation within a window surrounding said image and covering $p_1 \times p_c$ elements of the matrix, the said arrangement has:

a first mode of operation, denoted the search mode, during which on the one hand said matrix is read by grouping the $N_1$ lines m-by-m ($m < p_1$) in the output register, whereas on the other hand the output register is emptied by grouping 1 ($1 < p_c$) consecutive elements of the output register in the read arrangement of the matrix, in order to determine the brightest area $m \times l$ of the matrix defining the approximate position of the image on the matrix, a second mode of operation, denoted the measuring mode, during which the matrix is first read by grouping the lines in an n-by-n relationship ($n > p_1$), thereafter line by line in an area of k lines ($k > p_1$) located around said brightest area, and finally by again grouping the lines n-by-n until all the $N_1$ lines have been used.

Thus, in the measuring mode, the fact that n consecutive lines are transferred one after the other before the result of their accumulation is entered into the output register, which is then outside the area which is read line-sequentially, leads to a very perceptible reduction of the streak and thus clearly improves the contrast of the image. In fact, if TV is the transfer time of a line of the matrix and TH is the transfer time of an element of the output register, the integration time of the streak, when reading is effected line-sequentially, is given by:

$$y_1(TV + N_c TH) \approx y_1 N_c TH$$

wherein $y_1$ is the number of lines covered by the image of the luminous object. When reading is effected in packets of n lines ($n > y_l$), the streak is constituted: by a uniform streak, the integration time of which is $$y_l TV$$

and by a sequence of parasitic images of step n whose integration time is $$N_c TH$$

However, being located outside the measuring window, the parasitic images are not annoying and do not interfere with the contrast. The brightness ratio between the "line-by-line" streak and the "n-by-n" streak is therefore $$N_c TH/TV \text{ is } N_c \text{ if } TV \simeq TH$$

In the case of the Thomson-CSF TH 7863 matrix, $N_c$ will have a value of 384. The brightness of the streak in the case of reading the lines of the matrix n-by-n can therefore be practically neglected, hence a maximum contrast of the spot image, and this without having recourse to a mechanical shutter which shuts itself after the integration period.

It should be noted that reading the lines n-by-n is only possible to the extent to which it is known that before and after the image area no useful information is present and that it is furthermore known at which moment reading should be stopped or resumed in groups of n lines, as a result of roughly localizing the image obtained from the operation in the search mode.

Moreover, the arrangement according to the invention has the further advantage of significantly reducing the matrix read time. By way of example, the case of the matrix TH 7863 already mentioned will be considered, which matrix comprises a total of $N_1 = 576$ lines. The read time of the matrix is:

$$576(TV + 384TH) \simeq 576 \times 384 \times TH$$

in the case of a line sequential reading.

In the case reading is effected in groups of n = 15 lines and with a line-sequential read area of k = 15 lines, the read time of the matrix amounts to approximately:

$$37(15TV + 384TH) + 15(TV + 384TH) =$$
$$576 \times TV + 52 \times 384 \times TH \simeq 52 \times 384 \times TH$$

Consequently the saving in read time is 576/52, so of the order of 11. The interesting consequence of this reduction of the total read time of the matrix is the possibility of increasing the repetition frequency of the arrangement according to the invention.

BRIEF DESCRIPTION OF THE DRAWINGS

The following description, which is given by way of non-limitative example with reference to the accompanying drawings, will make the nature of the invention better understood and also how it can be put into effect.

DETAILED DESCRIPTION OF THE PREFERRED EMBODIMENT

Figure 1:
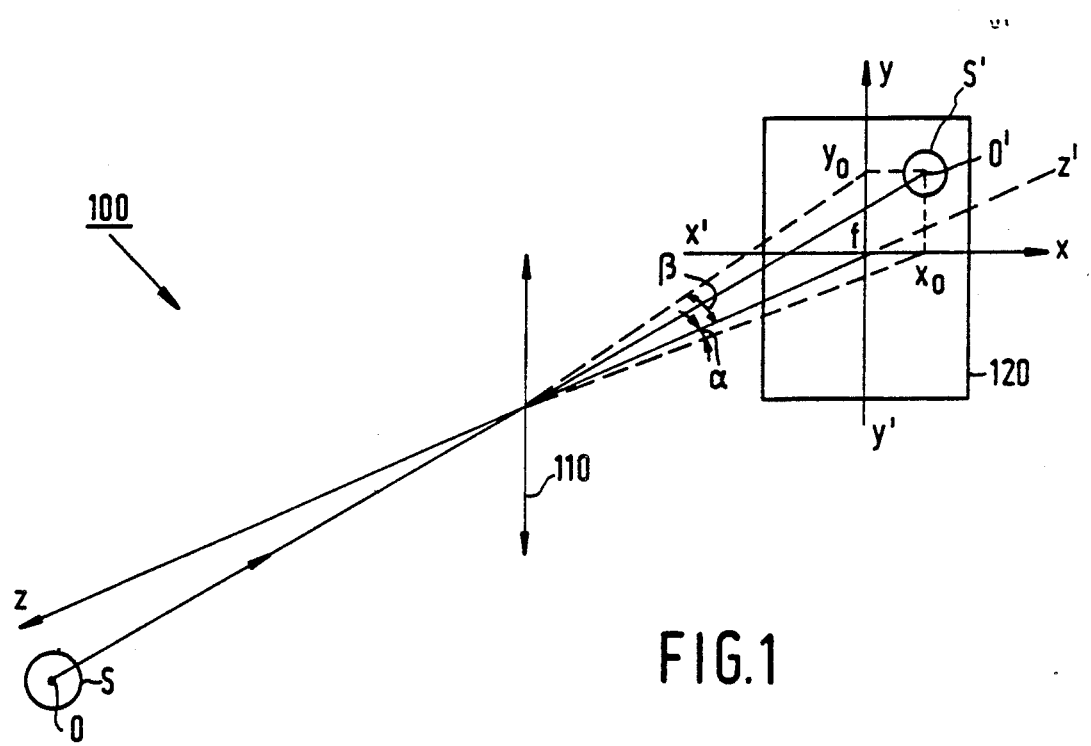
FIG. 1 is a perspective view of a circuit diagram of an arrangement for determining the direction of the energy center of a luminous object, according to the invention.

FIG. 1 shows schematically an arrangement 100 for determining the direction of the energy center 0 of a luminous object S, such as, for example, the sun. The arrangement 100 comprises a lens 110, optionally provided with a diaphragm (not shown), which forms an image S' having a center 0' of the luminous object S on a photo-sensitive detector 120. For the arrangement shown in FIG. 1, the photo-sensitive detector 120 is a charge-transfer matrix, located in the focal plane F of the lens 110, as in the case of the sun, or whose position with respect to the lens is adjusted, by defocalization, in such a way that the diameter of the spot image of the luminous object reaches some elements of the image, in the case of very small objects. The energy center 0' of the image S' is designated by its coordinates $x_0$ and $y_0$ in a coordinate system Fx, Fy linked to the matrix. Determining $x_0$ and $y_0$ renders it possible to calculate the angles $\alpha$ and $\beta$ which define the direction 0'0 searched with respect to the optical axis z'z of the lens 110.

Figure 2:
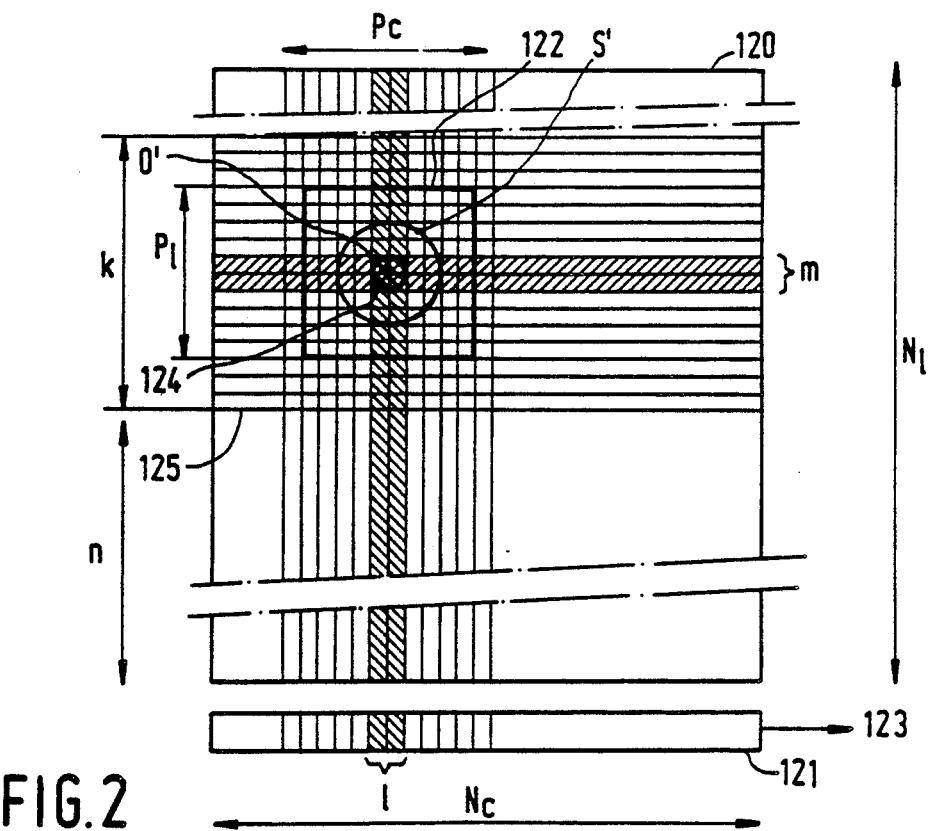
FIG. 2 shows a charge-transfer matrix used in the arrangement of FIG. 1.

As is indicated in FIG. 2, the matrix 120 comprises $N_1$ lines and $N_c$ columns having an output register 121 of $N_c$ elements. The matrix TH 7863 of Messrs. Thomson-CSF used by Applicants is formed from $N_1 = 576$ lines and $N_c = 384$ columns without memory zones. Should it be necessary, the matrix 120 may be cooled by a Peltier-effect module, this would more specifically be the case when the dark current is very high.

The position of the energy center 0' of the image S' of the luminous object S is determined, according to FIG. 2, by barycentric calculation within a window 122 surrounding the image S' and covering $P_1 \times P_c$ elements of the matrix 120.

By way of example, it should be noted that, using the matrix mentioned in the foregoing which has a diagonal of 16 mm and a lens of 11.5 mm, the arrangement 100 provides a field of 72°, which is definitely remarkable, as is also the relationship between the field and the precision of the determination of the average position of the luminous object during integration, this relation being 17000 for a precision of 15". The angular diameter of the sun being in the order of 30' of an arc and an image element of the matrix measuring approximately 22 $\mu$m, the geometrical image of the sun appears as a disc of $y_1 = 4.5$ to 5 image elements in diameter. Depending on the diaphragm stop, the diffraction spot may reach 1.5 image elements, which results in an image of the sun of 6.5 image elements. The measuring window 122 (the assembly of the elements on the basis of which the energy center of the image is calculated), which surrounds the image S', is formed by a minimum of $8 \times 8$ image elements. Consequently, a square of $p_1 = 10$ lines and $p_c = 10$ columns may be used for the window 122. The system described also offers the possibility of tracking the luminous object in an autonomous manner after the initial "lock-on", i.e. without exterior assistance, for motions which may reach several degrees per second.

The arrangement proposed has a first mode of operation, denoted the search mode, during which a zone 124 of m maximum signal lines and l columns delineating the approximate position of the sun on the matrix, is determined. m and l are less than $p_l$ and $p_c$, respectively and may, for example, be assumed to be equal to 2. Determining which area $m \times l$ 124 is the brightest, is realized by reading the $N_1$ lines of the matrix 120 by grouping them in a m-by-m relationship in the output register 121, and by then transferring l consecutive image elements of said output register to the read arrangement 123 of the matrix. This operation has the advantage of reducing the integration time necessary to obtain a usable signal in the search mode, by a factor of $m \times l$, here 4. It should moreover be noted that, particularly for the case the arrangement according to the invention is used on the ground, the search mode has for its object to adapt the lens diaphragm and the integration time to the charge-transfer matrix as a function of the received signal whose level can vary significantly, depending on the degree to which the sky is clouded over and the hour of observation, for example.

During the second mode of operation, the measuring mode which follows the search mode, the matrix 120 is exposed to the radiation of the sun during the integration period and with the diaphragm determined during the search. The matrix is thereafter read, first by grouping the lines in a n-to-n relationship wherein $n > p_l$, by way of indication a typical value for $n = 15$. Thereafter, in a zone 125 located around the brightest zone $m \times 1$ 124, reading the matrix 120 is effected line-sequentially during k lines. k is also greater than $p_l$ and may be chosen greater than or equal to n, here k varies from 15 to 30. Finally, the matrix is emptied again by grouping the lines in an n-by-n relationship until all the $N_1$ lines have been used up.

In the foregoing it has been described that the measuring mode thus performed results in a very significant improvement of the image contrast and, while reducing the read time, permits a higher repetition frequency.

We claim:

1. Apparatus for determining the direction of the energy center of a luminous object, comprising:
    a photo-sensitive charge transfer matrix detector without a memory including $N_l$ lines and $N_c$ columns and an output register having $N_c$ elements;
    lens means for forming an image of the luminous object on the detector;
    locating means coupled to the detector for determining the position of the energy center of the object by barycentric calculation within a window surrounding the image and covering $p_l \times P_c$ elements of the matrix, the locating means having a search mode for reading the matrix into the output register in groups of m lines wherein $m < P_l$ and reading the output register in groups of l consecutive elements where $l < P_c$ to determine the brightest $m \times l$ area of the matrix for determining the approximate position of the image, and a measuring mode for reading the matrix into the output register in groups of n lines where $n > P_l$ outside the approximate position of the image and reading k lines of the matrix containing the window where $k > P_l$ into the output register line by line around the approximate position of the image.

2. A method for determining the direction of the energy center of a luminous object, comprising:
    forming an image of the luminous object on a photo-sensitive charge transfer matrix detector without a memory including $N_l$ lines and $N_c$ columns and an output register having $N_c$ elements;
    determining the position of the energy center of the object by barycentric calculation within a window surrounding the image and covering $P_l \times P_c$ elements of the matrix, including determining the approximate position of the image in a search by reading the matrix into the output register in groups of m lines wherein $m < P_l$ and reading the output register in groups of l consecutive elements where $l < P_c$ to determine the brightest $m \times l$ area of the matrix and, in a measuring mode, for reading the matrix into the output register in groups of n lines where $n > P_l$ outside the approximate position of the image and reading k lines of the matrix containing the window where $k > P_l$ into the output register line by line around the approximate position of the image.

* * * * *